(12) United States Patent
Volkening

(10) Patent No.: US 7,245,833 B1
(45) Date of Patent: Jul. 17, 2007

(54) PHOTONIC CHANNELIZED RF RECEIVER EMPLOYING DENSE WAVELENGTH DIVISION MULTIPLEXING

(75) Inventor: Fred Allan Volkening, Boonsboro, MD (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 678 days.

(21) Appl. No.: 10/647,527

(22) Filed: Aug. 26, 2003

Related U.S. Application Data

(60) Provisional application No. 60/426,403, filed on Nov. 15, 2002.

(51) Int. Cl.
*H04B 10/00* (2006.01)
*H04B 10/08* (2006.01)
*H04B 17/00* (2006.01)
*H04B 10/06* (2006.01)

(52) U.S. Cl. .......................... 398/116; 398/34; 398/207
(58) Field of Classification Search .................. 398/59, 398/128
See application file for complete search history.

(56) References Cited

U.S. PATENT DOCUMENTS

| | | | | |
|---|---|---|---|---|
| 4,468,766 A * | 8/1984 | Spezio | ........................ | 359/326 |
| 5,940,196 A * | 8/1999 | Piehler et al. | ................. | 398/91 |
| 6,901,224 B1* | 5/2005 | Davis | .......................... | 398/202 |
| 7,085,499 B2* | 8/2006 | Yap et al. | .................... | 398/183 |
| 2001/0022877 A1* | 9/2001 | Sadot et al. | .................. | 385/27 |
| 2002/0041611 A1* | 4/2002 | May | ........................ | 372/29.02 |
| 2002/0088922 A1* | 7/2002 | Schmitz et al. | .......... | 250/206.1 |
| 2002/0109896 A1* | 8/2002 | Lauder et al. | ............... | 359/238 |
| 2003/0048503 A1* | 3/2003 | Aso et al. | .................... | 359/124 |
| 2004/0042083 A1* | 3/2004 | Turner, III | ................... | 359/578 |

OTHER PUBLICATIONS

W. Wang et al., "Characterization of a Coherent Optical RF Channelizer Based on a Diffraction Grating", IEEE Transactions on Microwave Theory and Techniques, vol. 49, No. 10, Oct. 2001.*
Wilfried Lenth, "*Optical heterodyne spectroscopy with frequency- and amplitude- modulated semiconductor lasers*", Optics Letter vol. 8, pp. 575-577, Nov. 1983.
Amnos Yariv, Optical Electronics 4th Edition Sanders College Publishing, pp. 115 & 331, 1991.

* cited by examiner

*Primary Examiner*—Shi K Li
(74) *Attorney, Agent, or Firm*—Edell, Shapiro & Finnan, LLC

(57) ABSTRACT

A photonic channelized receiver includes: an optical source, an optical combiner, an electro-optical modulator, an etalon, a wavelength splitter, and a set of detectors. The optical source produces a set of optical signals at spaced wavelengths, and the optical combiner combines the optical signals into a common beam. The electro-optical modulator modulates the common beam with an RF signal to produce sidebands offset from frequencies of the optical signals by the RF signal frequency. The etalon has a periodic transfer function that filters the modulated common beam such that the signals in the filtered, modulated common beam function as receiver channels corresponding to respective RF frequencies. The wavelength splitter separates the common beam into channel output signals whose intensities are a function of the frequency of the RF signal. The detectors measure the intensities of the channel output signals to determine the frequency of the RF signal.

46 Claims, 2 Drawing Sheets

PHOTONIC CHANNELIZED RF RECEIVER EMPLOYING DENSE WAVELENGTH DIVISION MULTIPLEXING

CROSS REFERENCE TO RELATED APPLICATION

This application claims priority from U.S. Provisional Patent Application Ser. No. 60/426,403, entitled "Dense Wavelength Division Multiplexing Based Photonic RF Spectrum Analyzer," filed Nov. 15, 2002. The disclosure of this provisional patent application is incorporated herein by reference in its entirety.

BACKGROUND OF THE INVENTION

1. Field of the Invention

The present invention relates to a photonic channelized receiver that employs Dense Wavelength Division Multiplexing (DWDM) technology and, more particularly, to a photonic channelized receiver useful for RF spectrum analysis.

2. Description of the Related Art

Electronic spectrum analyzers and channelized receivers for microwave and RF spectrum characterization applications are similar in operation in that they separate a wideband signal into a number of narrower individual channels. The electronic spectrum analyzer operates by scanning a narrow bandpass filter over the wideband frequency range, thus performing a serial scan of the band. In contrast, the channelized receiver performs the operation in parallel and includes of a plurality of bandpass filters connected in parallel to route the frequency bands of interest to separate detectors.

The principle shortcoming of RF spectrum analyzers is that they do not provide a near real time wideband spectral monitoring ability. In an RF spectrum analyzer, a narrowband filter is swept over the frequency range of interest so that only one band of frequencies is measured at a time. This approach precludes the ability to detect burst signals that exist for times shorter than the period of time required to sweep the band. Channelized receivers do provide the capability for wide bandwidth, near instantaneous signal detection. However, they are complex, have limited reliability and sensitivity, and are impractical if a large number of channels is required.

Electro-optical approaches for microwave and RF spectrum characterizations operate by the use of acousto-optic modulators, Bragg cells, or an etalon to convert a wideband electrical input signal into a proportional optical pattern that is detected and decoded to provide spectral information. However, electro-optical devices suffer from the inability to be implemented entirely in standard, commercial off-the-shelf (COTS) optical fiber components. Accordingly there remains a need for a practical and reliable device for RF spectrum analysis capable of near real time wideband spectral monitoring.

SUMMARY OF THE INVENTION

Therefore, in light of the above, and for other reasons that become apparent when the invention is fully described, an object of the present invention is to provide a photonic channelized receiver for RF spectrum analysis.

A further object of the present invention is to perform near real time wideband spectral monitoring.

Another object of the present invention is to provide the capability to reliably detect short-duration burst signals over a frequency band of interest.

Yet a further object of the present invention is to employ a channelized receiver design having high reliability and sensitivity and being capable of processing a large number of channels.

A still further object of the present invention is to implement a channelized receive for RF spectrum analysis in standard, commercial off-the-shelf (COTS) optical fiber components.

The aforesaid objects are achieved individually and in combination, and it is not intended that the present invention be construed as requiring two or more of the objects to be combined unless expressly required by the claims attached hereto.

As described herein, a photonic channelized receiver includes: an optical source that produces a plurality of optical signals at respective, spaced wavelengths; an optical combiner configured to combine the optical signals into a common beam; an electro-optical modulator that modulates the common beam with an RF signal to produce sidebands offset from frequencies of the optical signals by the frequency of the RF signal; an etalon having a periodic transfer function that filters the modulated common beam such that the optical signals in the filtered, modulated common beam function as receiver channels corresponding to respective RF frequencies; a wavelength splitter configured to separate the filtered, modulated common beam into a plurality of channel output signals whose intensities are a function of the frequency of the RF signal; and a plurality of detectors that respectively measure the intensities the channel output signals to determine the frequency of the RF signal.

The optical signals correspond to respective frequency channels and the etalon has a plurality of etalon transmission peaks corresponding to the respective frequency channels, such that a frequency offset between a frequency channel's etalon transmission peak and optical signal varies among the frequency channels. Each frequency channel corresponds to an RF frequency that is a function of the offset between the frequency channel's etalon transmission peak and optical signal. More specifically, the optical signals are substantially equally spaced with a first frequency spacing, and the etalon has periodic transmission peaks that are substantially equally spaced with a second frequency spacing that is different from the first frequency spacing, such that frequency offsets between corresponding optical signals and etalon transmission peaks vary for successive optical signals.

The optical source can comprise a plurality of laser sources, such a continuous wave (CW) lasers, which may be CW Dense Wavelength Division Multiplexed (DWDM) laser sources. DWDM wavelength lockers may be used to lock the optical source to set wavelengths. The optical combiner can be a Dense Wavelength Division Multiplexer, and the electro-optical modulator can comprise a LiNiBO electro-optical phase modulator or a Mach-Zehnder amplitude modulator. The etalon is preferably a fiber-coupled high-finesse etalon, such as a Fabry-Perot etalon with temperature control. The wavelength splitter can also be a fiber-coupled device, such as a Dense Wavelength Division Demultiplexer. Preferably, high speed optical detectors are employed, such as photodiodes, whose outputs yield near real time measurement of the RF signal.

In accordance with another embodiment, the laser sources of the photonic channelized are modulated by the RF signal prior to being combined into a common beam. This approach eliminates the need for an electro-optical phase modulator between the optical combiner and the etalon but requires separate modulation of each of the optical signals.

The above and still further objects, features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DESCRIPTION OF THE PREFERRED EMBODIMENTS

Figure 1:
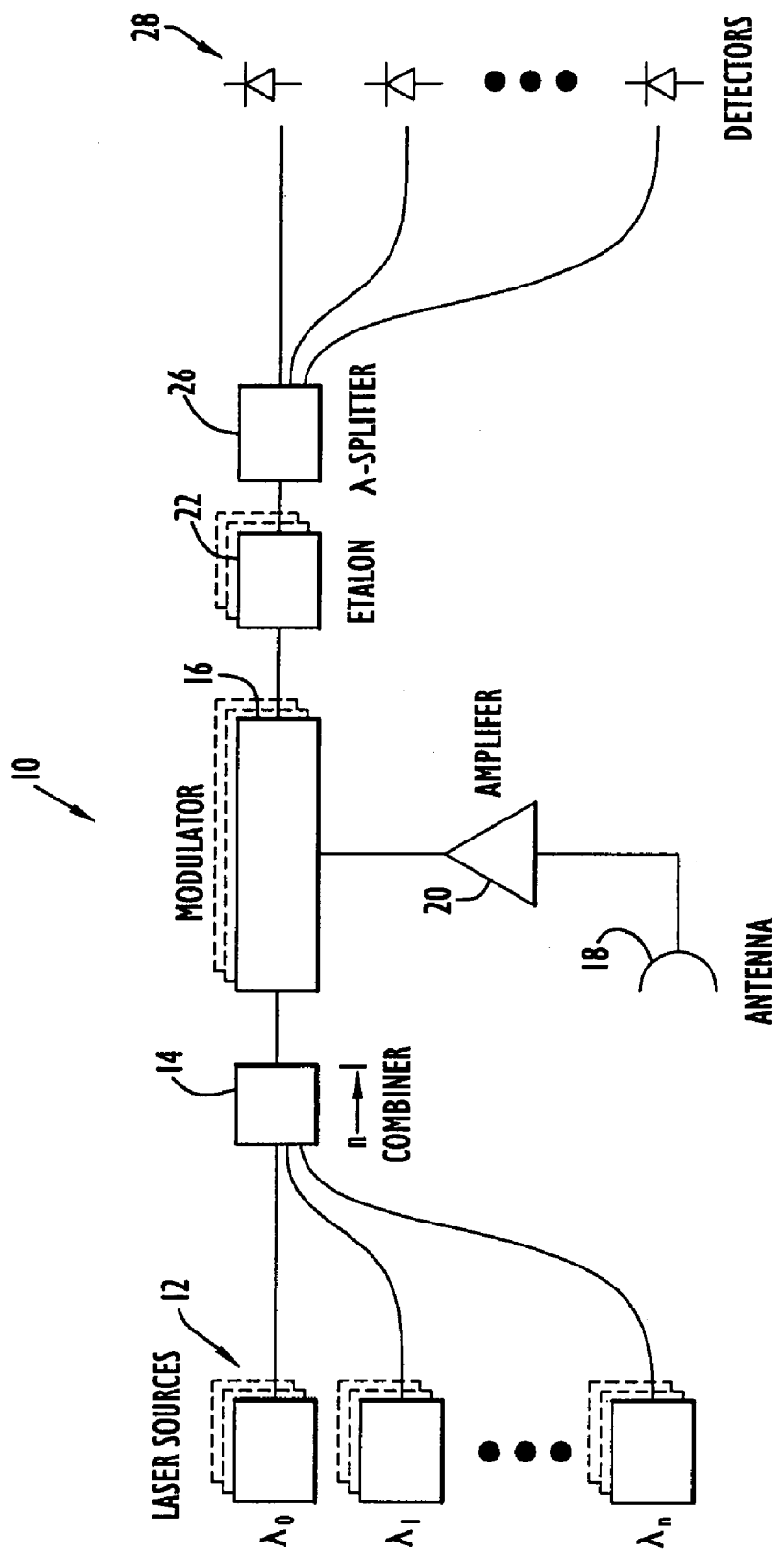
FIG. 1 is a block diagram illustrating the architecture of a photonic channelized receiver useful for RF spectrum analysis in accordance with an exemplary embodiment of the present invention.

A photonic channelized receiver 10 useful for RF spectrum analysis is illustrated in FIG. 1. Receiver 10 includes a set of laser sources 12 that supply a respective set of optical signals whose wavelengths are separated by substantially equal spacings. Specifically, a first laser source generates an optical signal at a particular wavelength $\lambda_0$. The second laser source generates an optical signal at a longer wavelength $\lambda_1$. Since these optical signals are used to define receiver frequency channels, their separation can be described in terms of frequency. For example, the optical signal at $\lambda_0$ can be separated from the optical signal at $\lambda_1$ by a nominal frequency of 99.5 GHz. An optical signal generated by a next laser source at a next longer wavelength $\lambda_2$ is separated from the optical signal at $\lambda_1$ by another 99.5 GHz, and each successive optical signal generated up to wavelength $\lambda_n$ is separated from optical signals at adjacent wavelengths by 99.5 GHz. In this manner, a set of equally-spaced optical signals is generated by the set of laser sources. While a 99.5 GHz spacing is described herein for illustrative purposes, it will be understood that any suitable spacing may be used between adjacent optical signals. By way of non-limiting example, the laser sources can be fiber-coupled tunable lasers developed for Dense Wavelength Division Multiplexing (DWDM), such as continuous wave (CW) DWDM laser diodes.

An n-to-1 wavelength combiner 14, such as a DWDM combiner (e.g., a Dense Wavelength Division Multiplexer), combines the n optical signals generated by the n laser sources into a common beam in a single fiber. The number of optical signals n can have any value up to the maximum number of signals feasibly combinable by combiner 14. The common beam generated by combiner 14 is supplied to an electro-optical modulator 16, such as a LiNiBO (lithium niobate) electro-optical phase modulator. An RF signal of interest arriving at an antenna 18 is amplified by amplifier 20 and supplied to modulator 16. Modulator 16 modulates the common beam with the RF signal by producing sidebands to the laser lines (i.e., the frequencies of the optical signals) at the RF frequency of the signal received by the antenna. In the case of phase modulation, the effect of the electro-optical phase modulator on a single laser line is given by the equation:

$$e_n(t) = e_o \cos(\omega_n t + \delta \cos \omega_m t))$$

where $e_n$ is the output electric field from the modulator, $\omega_n$ is the laser frequency, $\delta$ is the phase modulation coefficient (related to the material and applied voltage) and $\omega_m$ is the RF frequency. Expanding this expression using the Bessel function identities one finds:

$$e_n(t) = e_o \left\{ \cos \omega_n t + \delta \cos(\omega_n \pm \omega_m) t + \frac{\delta^2}{2} \cos(\omega_n \pm 2\omega_m) t + \ldots \right\}$$

For small values of $\delta$, $J_0(\delta) \sim 1$, $J_1(\delta) \sim \delta/2$, and all other terms vanish. Thus, it can be seen that the effect of phase modulation is to induce sidebands on the laser lines of the common beam at $\omega_n \pm \omega_m$. Another technique that can be used to achieve modulation is to use a Mach-Zehnder type electro optical amplitude modulator to produce the RF sidebands. Thus, modulator 16 can be a phase modulator or an amplitude modulator.

Another technique for imposing sidebands on the laser lines at $\omega_n \pm \omega_m$ is to directly modulate each of the laser diode sources at the RF frequency. This technique has been used in heterodyne and FM optical spectroscopy applications and has been shown to result in a power spectrum consisting of the carrier $\omega_o$ and two sidebands at $\omega_n \pm \omega_m$. To implement this approach, the electro-optical phase modulator shown in FIG. 1 is removed, and a common RF drive signal is supplied to all of the laser sources from the antenna. The electro-optical phase or amplitude modulator approach is simpler to implement in comparison to the RF current drive approach in that there is a need to drive only one element (the phase or amplitude modulator) through which all of the optical carriers travel.

Figure 2:
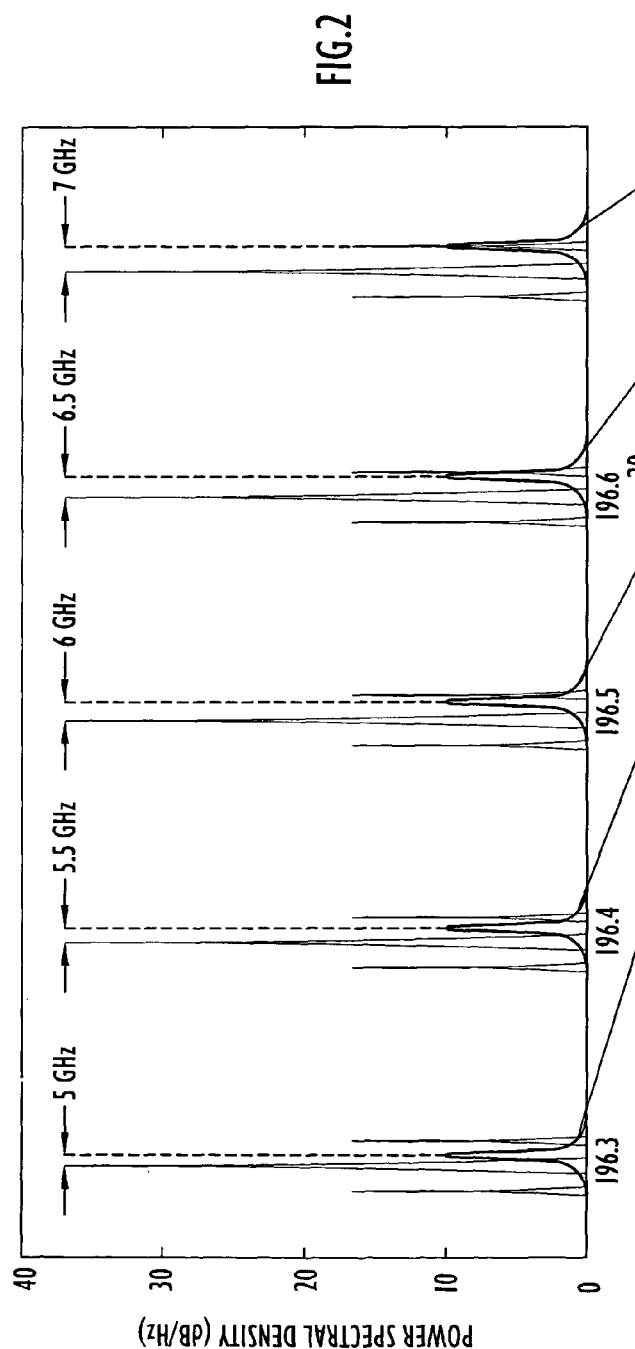
FIG. 2 is a graph illustrating the relationship between a periodic etalon transmission characteristic and equally-spaced optical signals generated by laser sources along with sideband resulting from modulation with an RF signal, which combine to perform a channelized receiver function in accordance with the exemplary embodiment.
Figure 3:
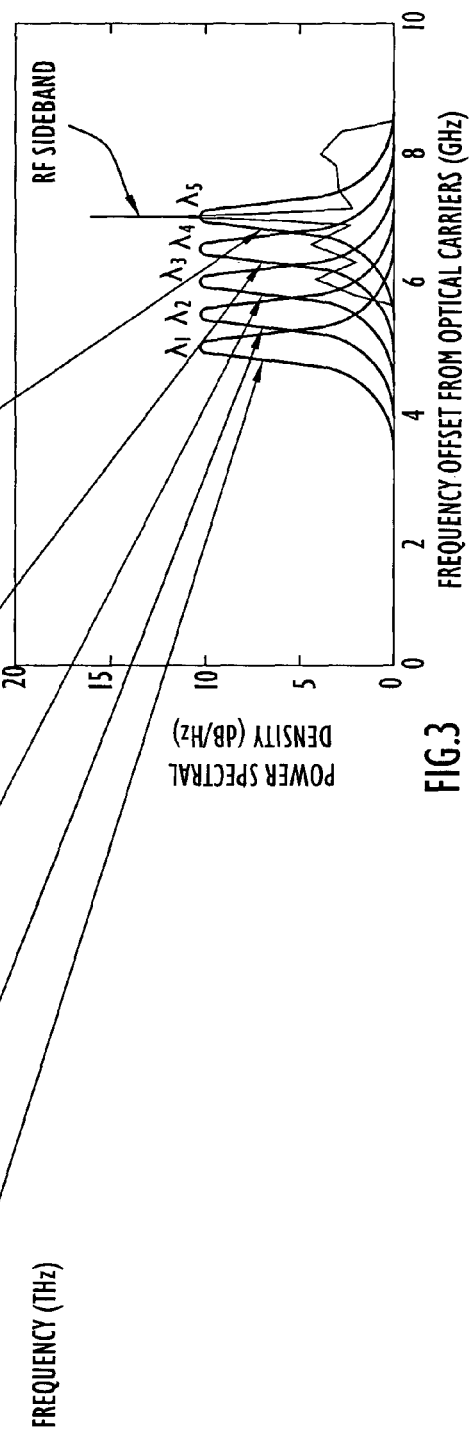
FIG. 3 is a graph illustrating the power spectral densities of the frequency offsets of the periodic etalon characteristic from the optical carriers, together with the power spectral density of an RF signal modulating the optical carriers to produce a sideband.

Referring again to FIG. 1, a free space coupling scheme (e.g., fiber optic collimators) or fiber coupling can be used to couple the modulated common beam from phase modulator 16 into an etalon 22. Preferably, the etalon is a high finesse, fiber-coupled etalon, such as a Fabry-Perot etalon. The etalon has a periodic transfer function that provides a filtering function at set spacings relative the fixed optical source wavelengths. The width of the transmission peaks are called the etalon resolution and depend on the reflectivity of the etalon surfaces. The ratio of the separation between the peaks to the resolution is termed the finesse of the etalon. The transmission characteristic of a representative etalon is shown in FIG. 2 relative to a set of equally-spaced wavelengths generated by laser sources. For the etalon shown in FIG. 2, the finesse has a value of 200, which is easily achievable with a COTS etalon. Of course, the invention is not limited to any particular finesse value. As described in greater detail below, the set of equally-spaced, phase-modulated optical wavelengths, combined with the periodic transfer function of the etalon, performs a channelized receiver function to produce a set of parallel, channel output signals that depend on the frequency of the RF signal applied to the electro-optical phase modulator.

A free space coupling scheme (fiber optic collimators) or fiber coupling scheme can be used to couple the common beam out of the etalon. The filtered, phase-modulated common beam emerging from the etalon is passed to a DWDM wavelength splitter 26 (e.g., a Dense Wavelength Division Demultiplexer) which separates the common beam into separate channel output signals corresponding to the wavelengths of the laser sources. It is assumed that the RF frequency is less than the channel spacing so that the wavelength splitter functions correctly. This implies that the modulation frequency is limited to approximately one-fifth of the separation of the laser lines, or 10 GHz in the present example.

The set of channel output signals is supplied via fiber coupling to a set of respective detectors 28 that respectively measure the intensities of the channel output signals, which correspond to the different wavelength signals split from the common beam. High speed detectors, such as photodiodes, are preferably used to provide the capability for near real time RF signal measurement.

One technique which can be used to achieve stabilization of the etalon and laser diode sources is to use a second temperature stabilized locking etalon of low finesse similar to the approach used in DWDM wavelength lockers.

The principle of operation of the described photonic channelized receiver is based on the periodic transmission properties of a Fabry-Perot etalon in conjunction with equally spaced laser lines. Referring again to FIG. 2, the etalon has a periodic transfer function resulting in a transmission characteristic having peaks at equally-spaced wavelengths. In the non-limiting example shown in FIG. 2, the etalon spacing or Free Spectral Range (FSR) of the etalon is set at 100 GHz. In contrast to the 100 GHz spacing of the etalon transmission peaks, the wavelengths of the optical signals generated by the laser sources are separated by 99.5 GHz. Only five channels are shown in FIG. 2 for purposes of illustrating the concept of operation; however, it will be understood that the invention is not limited any particular number of channels or to particular wavelength spacings.

Each laser is locked at a fixed, incremented offset from a corresponding etalon fringe. The first laser is locked to a peak in the etalon transmission at approximately 196.3 THz, such that the frequency difference or offset ($\Delta v$) between the etalon transmission peak and the wavelength of the first laser is substantially 5 GHz. As a result of the slight difference between the spacing of the etalon transmission peaks and the spacing of the laser signal wavelengths, the second laser, spaced at 99.5 GHz from the first laser, is offset by 5.5 GHz from the next etalon transmission peak at approximately 196.4 THz, which is offset from the first etalon transmission peak by 100 GHz.

Due to the cumulative effect of the differential spacing, the offset between successive laser signals and the corresponding etalon transmission peaks steadily increases with each successive channel. In particular, the wavelength of the laser of the third channel is offset from the corresponding etalon transmission peak by 6 GHz, the wavelength of the laser of the fourth channel is offset from the corresponding etalon transmission peak by 6.5 GHz, and the wavelength of the laser of the fifth channel is offset from the corresponding etalon transmission peak by 7 GHz. Each of the etalon peaks functions as a filter that slices out the energy in the RF sidebands centered at 5, 5.5, 6, 6.5, 7 GHz, etc. By way of non-limiting example, the etalon filter can have a width of 500 MHz.

As described above, when an RF modulation is applied to the common beam, sidebands are produced on the laser lines at $\omega_n \pm \omega_m$, where $\omega_n$ is the center frequency of the nth laser line and $\omega_m$ is the frequency of the RF signal from the antenna. This modulation results in a change in the measured intensity at the detectors. More specifically, because a portion of the signal energy appears at the sideband frequency $\omega_n \pm \omega_m$, the receiver channel whose etalon transmission peak offset is closest to $\omega_m$ produces a signal intensity greater than the signal intensity of an un-modulated signal, thereby indicating the presence of an RF signal at that frequency.

Operation of the photonic channelized receiver is illustrated with an example of an RF signal having an integral frequency of 7 GHz. Five laser sources generate five separate optical signals at equally spaced wavelengths $\omega_1$-$\omega_5$, with 99.5 GHz spacings between adjacent wavelengths. The five optical signals are combined into a common beam within a single fiber by a DWDM combiner. The electro-optical phase modulator modulates the common beam with the 7 GHz RF signal, thereby producing sidebands on all the laser lines at $\omega_n \pm 2\pi(7 \text{ GHz})$. For channels 1, 2, 3 and 4, the intensity of the output signal will decrease relative to the un-modulated case, since a portion of the signal energy is diverted to the sidebands. However, in channel 5, which has a frequency offset $\Delta v$ of 7 GHz (i.e., the etalon transmission peak is offset from the frequency of the optical signal laser line by 7 GHz), the wavelength of one of the sidebands corresponds to the wavelength of the etalon transmission peak, such that the energy in the sideband is minimally attenuated by the etalon filter and appears in the detected output signal intensity. Consequently, the intensity of the detected output signal for this channel increases relative to the un-modulated case, or at least decreases less significantly than the other channels, thereby indicating the presence of a signal in this channel (i.e., a 7 GHz RF signal). Therefore, by measuring the intensity of the five laser lines after passing through the etalon, one can determine the RF modulation frequency. The near real time measurement performance can be achieved by using high speed photodetectors and analog-to-digital converters to measure the transmission characteristics for each of the five channels.

A de-multiplexer then separates out the energy in each of the filtered laser sidebands before going to the detectors. This approach will work using all COTS components for "small" offsets compared to the ITU grid spacing. For example, a system with 20 GHz range and lasers that are separated by 100.5, 101, ..., 120 GHz will work with COTS multiplexers and demultiplexers that are designed for the ITU grid spacing of 100 GHz and have ±50 GHz passband.

To achieve a wideband channelized receiver capability, the photonic channelized receiver may include any number of electro-optical phase modulators, etalons and laser sources configured for operation in parallel, as suggested by the dashed boxes shown in FIG. 1. Further, the photonic channelized receiver may be configured with multiple phase modulators and etalons to provide two or more receiver channel bandwidths.

As will be appreciated from the foregoing description, a key innovation of the disclosed photonic channelized receiver is the concept of using multiple lasers separated by regular wavelength intervals in conjunction with an etalon with a periodic transmission characteristic. The result of this arrangement is that spectral resolution becomes a function of the number of lasers and the etalon transmission characteristic, and can be arbitrarily improved by decreasing the spacing intervals. This approach ensures sufficient spectral resolution of an incoming RF signal and forms the basis for a real time spectrum analyzer.

Another innovative aspect of the disclosed photonic channelized receiver is that the extensive technology base developed for DWDM optical communication systems is leveraged to solve critical and currently unfulfilled intelligence collection requirements that have been heretofore addressed using only RF techniques. DWDM is a technology in which multiple signals at different wavelengths are transmitted over a common fiber optic medium. The technical rationale for the novel DWDM based optical wideband RF spectrum analyzer involves three key elements: DWDM communications technology for the generation, combining and splitting of multiple closely-spaced wavelengths in optical fiber systems; direct frequency modulation of the lasers or the use of electro-optical modulation to produce sidebands on the laser carrier frequencies; and the high "Q" periodic transfer function of a Fabry Perot Etalon.

Dense Wavelength Division Multiplexing technology is being driven by the commercial need for increased bandwidth in existing fiber optic systems. The technology is based on wavelength multiplexing of data with channel spacing as small as 50 GHz (current International Telecommunication Union (ITU) specifications correspond to 0.4 nm (50 GHz) and 0.8 nm (100 GHz) in a band centered at approximately 1.55 μm). To enable the implementation of this technology, COTS tunable lasers have been developed to enable simple field replacement in the event of a laser failure (i.e., a single laser can cover the ITU grid of standard wavelengths). Fiber optic based wavelength combiners are also COTS equipment that enable the combination of up to forty different wavelengths on a single fiber at the transmit end. In conjunction with the combiner technology, fiber coupled wavelength splitters have been developed to separate the wavelengths at the receive end. (Note that Add/Drop multiplexers are also COTS equipment to enable the addition of, or dropping, of wavelengths along the network path.) The disclosed channelized receiver incorporates all three of these COTS items: lasers, combiner, and splitter, but differs from a standard DWDM optical fiber communication system in that the lasers are frequency modulated (for example, using an electro-optical phase modulator) and filtered using an etalon.

The described electro-optic channelized receiver is capable of near instantaneous wideband spectrum analysis. This receiver overcomes the difficulties of the electronic spectrum analyzers and channelized receivers by providing the capability for larger instantaneous bandwidths, improved sensitivity, reduced complexity, and larger channel counts. Consequently, the system can reliably detect short-duration burst signals across an entire frequency band of interest. This approach also allows the entire system to be implemented with commercial off-the-shelf (COTS) optical communications components, resulting in a simplification of alignment and operation compared to existing electro-optical approaches for wide band spectral analysis.

Having described preferred embodiments of new and improved photonic channelized receiver useful for RF spectrum analysis, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A photonic channelized receiver, comprising:
    an optical source, of the receiver, that produces a plurality of optical signals at respective, spaced wavelengths;
    an optical combiner, of the receiver, configured to combine the plurality of optical signals into a common beam;
    an electro-optical modulator, of the receiver, that modulates the common beam with an RF signal to produce sidebands offset from frequencies of the plurality of optical signals by the frequency of the RF signal;
    an etalon having a periodic transfer function that filters the modulated common beam such that the optical signals in the filtered, modulated common beam function as receiver channels corresponding to respective different RF frequencies, wherein the plurality of optical signals corresponds to a plurality of respective frequency channels and the etalon has a plurality of etalon transmission peaks corresponding to the respective frequency channels, such that a frequency offset between a frequency channel's etalon transmission peak and optical signal varies among the frequency channels;
    a wavelength splitter configured to separate the filtered, modulated common beam into a plurality of channel output signals whose intensities are a function of the frequency of the RF signal; and
    a plurality of detectors that respectively measure the intensities of the channel output signals to indicate the frequency of the RF signal.

2. The photonic channelized receiver of claim 1, wherein each frequency channel corresponds to an RF frequency that is a function of the offset between the frequency channel's etalon transmission peak and optical signal.

3. The photonic channelized receiver of claim 1, wherein the optical signals are substantially equally spaced with a first frequency spacing, and the etalon has periodic transmission peaks that are substantially equally spaced with a second frequency spacing different from the first frequency spacing, such that frequency offsets between corresponding optical signals and etalon transmission peaks vary for successive optical signals.

4. The photonic channelized receiver of claim 1, wherein the optical source comprises a plurality of continuous wave (CW) lasers.

5. The photonic channelized receiver of claim 1, wherein the optical source comprises a plurality of continuous wave (CW) Dense Wavelength Division Multiplexed (DWDM) Communications laser sources.

6. The photonic channelized receiver of claim 1, further comprising Dense Wavelength Division Multiplexed (DWDM) wavelength lockers that lock the optical source to set wavelength offsets from ITU grid wavelengths.

7. The photonic channelized receiver of claim 1, wherein the optical combiner comprises a Dense Wavelength Division Multiplexer.

8. The photonic channelized receiver of claim 1, wherein the electro-optical modulator comprises an electro-optical phase modulator.

9. The photonic channelized receiver of claim 8, wherein the electro-optical phase modulator comprises a lithium niobate electro-optical phase modulator.

10. The photonic channelized receiver of claim 1, wherein the electro-optical modulator comprises an amplitude modulator.

11. The photonic channelized receiver of claim 10, wherein the electro-optical amplitude modulator comprises a Mach-Zehnder amplitude modulator.

12. The photonic channelized receiver of claim 1, wherein the etalon comprises a Fabry-Perot etalon.

13. The photonic channelized receiver of claim 1, wherein the etalon comprises a fiber-coupled high-finesse etalon.

14. The photonic channelized receiver of claim 1, wherein the wavelength splitter comprises a Dense Wavelength Division Demultiplexer.

15. The photonic channelized receiver of claim 1, wherein the wavelength splitter comprises a fiber-coupled device.

16. The photonic channelized receiver of claim 1, wherein the detectors are high speed optical detectors whose outputs yield near real time measurement of the RF signal.

17. The photonic channelized receiver of claim 1, wherein optical source is one of a plurality of optical sources operating in parallel and the electro-optical modulator is one of a plurality of respective electro-optical modulators operating in parallel to provide a wideband channelized receiver capability.

18. The photonic channelized receiver of claim 1, comprising a plurality of corresponding optical sources, electro-optical modulators and etalons operating at different frequency bands to provide a respective plurality of receiver channel bandwidths.

19. The photonic channelized receiver of claim 1, wherein photonic channelized receiver is a photonic RF spectrum analyzer.

20. The photonic channelized receiver of claim 1, wherein the plurality of detectors correspond to different RF frequencies and the photonic channelized receiver compares intensities of the channel output signals of the detectors to determine the frequency of the RF signal.

21. The photonic channelized receiver of claim 1, wherein the receiver further comprises an RF antenna for receiving the RF signal.

22. A photonic channelized receiver, comprising:
means for producing a plurality of optical signals at respective, spaced wavelengths at the receiver;
means for combining the plurality of optical signals into a common beam at the receiver;
means for modulating the common beam with an RF signal to produce sidebands offset from frequencies of the plurality of optical signals by the frequency of the RF signal at the receiver;
means for filtering the modulated common beam such that the plurality of optical signals in the filtered, modulated common beam function as receiver channels corresponding to respective different RF frequencies, wherein the plurality of optical signals corresponds to a plurality of respective frequency channels and the means for filtering produces filter transmission peaks corresponding to the respective frequency channels, such that a frequency offset between a frequency channel's filter transmission peak and optical signal varies among the frequency channels;
means for separating the filtered, modulated common beam into a plurality of channel output signals whose intensities are a function of the frequency of the RF signal; and
means for measuring the intensities of the channel output signals to indicate the frequency of the RF signal.

23. The photonic channelized receiver of claim 22, wherein each frequency channel corresponds to an RF frequency that is a function of the offset between the frequency channel's filter transmission peak and optical signal.

24. The photonic channelized receiver of claim 22, wherein the optical signals are substantially equally spaced with a first frequency spacing, and the means for filtering has periodic transmission peaks that are substantially equally spaced with a second frequency spacing different from the first frequency spacing, such that frequency offsets between corresponding optical signals and filter transmission peaks vary for successive optical signals.

25. The photonic channelized receiver of claim 22, wherein the means for modulating phase modulates the common beam.

26. The photonic channelized receiver of claim 22, wherein the means for modulating amplitude modulates the common beam.

27. A photonic channelized receiver, comprising:
an optical source, of the receiver, that produces a plurality of optical signals at respective, spaced wavelengths, wherein each of the plurality of optical signals is modulated with an RF signal to produce sidebands offset from frequencies of the plurality of optical signals by the frequency of the RF signal;
an optical combiner, of the receiver, configured to combine the plurality of optical signals into a common beam;
an etalon having a periodic transfer function that filters the common beam such that the optical signals in the filtered common beam function as receiver channels corresponding to respective different RF frequencies, wherein the plurality of optical signals corresponds to a plurality of respective frequency channels and the etalon has a plurality of etalon transmission peaks corresponding to the respective frequency channels, such that a frequency offset between a frequency channel's etalon transmission peak and optical signal varies among the frequency channels;
a wavelength splitter configured to separate the filtered common beam into a plurality of channel output signals whose intensities are a function of the frequency of the RF signal; and
a plurality of detectors that respectively measure the intensities of the channel output signals to indicate the frequency of the RF signal.

28. The photonic channelized receiver of claim 27, wherein each frequency channel corresponds to an RF frequency that is a function of the offset between the frequency channel's etalon transmission peak and optical signal.

29. The photonic channelized receiver of claim 27, wherein the optical signals are substantially equally spaced with a first frequency spacing, and the etalon has periodic transmission peaks that are substantially equally spaced with a second frequency spacing different from the first frequency spacing, such that frequency offsets between corresponding optical signals and etalon transmission peaks vary for successive optical signals.

30. The photonic channelized receiver of claim 27, wherein the optical source comprises a plurality of continuous wave (CW) lasers.

31. The photonic channelized receiver of claim 27, wherein the optical source comprises a plurality of continuous wave (CW) Dense Wavelength Division Multiplexed (DWDM) Communications laser sources.

32. The photonic channelized receiver of claim 27, further comprising Dense Wavelength Division Multiplexed (DWDM) wavelength lockers that lock the optical source to set wavelength offsets from ITU grid wavelengths.

33. The photonic channelized receiver of claim 27, wherein the optical combiner comprises a Dense Wavelength Division Multiplexer.

34. The photonic channelized receiver of claim 27, wherein the etalon comprises a Fabry-Perot etalon.

35. The photonic channelized receiver of claim 27, wherein the etalon comprises a fiber-coupled high-finesse etalon.

36. The photonic channelized receiver of claim 27, wherein the wavelength splitter comprises a Dense Wavelength Division Demultiplexer.

37. The photonic channelized receiver of claim 27, wherein the wavelength splitter comprises a fiber-coupled device.

38. The photonic channelized receiver of claim 27, wherein the detectors are high speed optical detectors whose outputs yield near real time measurement of the RF signal.

39. The photonic channelized receiver of claim 27, wherein photonic channelized receiver is a photonic RF spectrum analyzer.

40. The photonic channelized receiver of claim 27, wherein the plurality of detectors correspond to different RF frequencies and the photonic channelized receiver compares intensities of the channel output signals of the detectors to determine the frequency of the RF signal.

41. A method of detecting an RF signal, comprising:
   a) generating a plurality of optical signals at respective, spaced wavelengths;
   b) combining the plurality of optical signals into a common beam;
   c) modulating the common beam with the RF signal to produce sidebands offset from frequencies of the plurality of optical signals by the frequency of the RF signal;
   d) filtering the modulated common beam with an etalon, such that the optical signals in the filtered, modulated common beam function as receiver channels corresponding to respective different RF frequencies, wherein the plurality of optical signals correspond to a plurality of respective frequency channels and the etalon has a plurality of etalon transmission peaks corresponding to the respective frequency channels, such that a frequency offset between a frequency channel's etalon transmission peak and optical signal varies among the frequency channels;
   e) separating the filtered, modulated common beam into a plurality of channel output signals whose intensities are a function of the frequency of the RF signal; and
   f) measuring the intensities of the channel output signals to determine the frequency of the RF signal.

42. The method of claim 41, wherein (c) includes phase modulating the common beam with the RF signal.

43. The method of claim 41, wherein (c) includes amplitude modulating the common beam with the RF signal.

44. The method of claim 41, wherein each frequency channel corresponds to an RF frequency that is a function of the offset between the frequency channel's etalon transmission peak and optical signal.

45. The method of claim 41, wherein the optical signals are substantially equally spaced with a first frequency spacing, and the etalon has periodic transmission peaks that are substantially equally spaced with a second frequency spacing different from the first frequency spacing, such that frequency offsets between corresponding optical signals and etalon transmission peaks vary for successive optical signals.

46. A method of detecting an RF signal, comprising:
   a) generating a plurality of optical signals at respective, spaced wavelengths;
   b) modulating the plurality of optical signals to produce sidebands offset from frequencies of the plurality of optical signals by the frequency of the RF signal;
   c) combining the plurality of modulated optical signals into a common beam;
   d) filtering the common beam with an etalon, such that the optical signals in the filtered common beam function as receiver channels corresponding to respective different RF frequencies, wherein the plurality of optical signals correspond to a plurality of respective frequency channels and the etalon has a plurality of etalon transmission peaks corresponding to the respective frequency channels, such that a frequency offset between a frequency channel's etalon transmission peak and optical signal varies among the frequency channels;
   e) separating the filtered common beam into a plurality of channel output signals whose intensities are a function of the frequency of the RF signal; and
   f) measuring the intensities of the channel output signals to determine the frequency of the RF signal.

* * * * *